(12) United States Patent
Ahn et al.

(10) Patent No.: US 11,038,436 B2
(45) Date of Patent: Jun. 15, 2021

(54) INVERTER SYSTEM

(71) Applicants: LSIS CO., LTD., Anyang-si (KR); SEOUL NATIONAL UNIVERSITY R&DB FOUNDATION, Seoul (KR)

(72) Inventors: Sung-Guk Ahn, Anyang-si (KR); Seung-Ki Sul, Anyang-si (KR); Hyun-Sam Jung, Anyang-si (KR); Jeong-Mock Yoo, Anyang-si (KR)

(73) Assignee: LSIS CO., LTD., Anyang-si (KR)

(*) Notice: Subject to any disclaimer, the term of this patent is extended or adjusted under 35 U.S.C. 154(b) by 0 days.

(21) Appl. No.: 16/637,433

(22) PCT Filed: Jul. 18, 2018

(86) PCT No.: PCT/KR2018/008109
§ 371 (c)(1),
(2) Date: Feb. 7, 2020

(87) PCT Pub. No.: WO2019/059510
PCT Pub. Date: Mar. 28, 2019

(65) Prior Publication Data
US 2020/0228028 A1    Jul. 16, 2020

(30) Foreign Application Priority Data

Sep. 25, 2017 (KR) .................. 10-2017-0123402
Sep. 25, 2017 (KR) .................. 10-2017-0123403

(51) Int. Cl.
*H02M 7/487* (2007.01)
*H02M 7/483* (2007.01)
(Continued)

(52) U.S. Cl.
CPC ............ *H02M 7/483* (2013.01); *H01F 30/12* (2013.01); *H02M 1/12* (2013.01); *H02M 7/217* (2013.01);
(Continued)

(58) Field of Classification Search
CPC .................. H02M 2007/4835; H02M 7/487
(Continued)

(56) References Cited

U.S. PATENT DOCUMENTS 8,922,151 B2 * 12/2014 Yoo ............... H02M 5/4585
                                                        318/632
9,331,595 B2 * 5/2016 Yoo ............... H02M 7/483
(Continued)

FOREIGN PATENT DOCUMENTS

CN          205725503 U      11/2016
EP            2822164 A2      1/2015
(Continued)

OTHER PUBLICATIONS

International Search Report for related International Application No. PCT/KR2018/008109; report dated Mar. 28, 2019; (3 pages).
(Continued)

*Primary Examiner* — Gary A Nash
(74) *Attorney, Agent, or Firm* — K&L Gates LLP

(57) ABSTRACT

A unit power cell of an inverter system, according to one embodiment of the present invention, comprises: a first leg including first and fourth switching elements, which are connected in series to each other, second and third switching elements, which are connected in series with each other between a connection point of the first and second switching elements and a smoothing unit, and first, second, third and fourth diodes, which are inversely and respectively connected in parallel with the first, second, third and fourth switching elements; and a second leg connected in parallel with the first leg and including fifth and sixth switching elements, which are connected in series to each other, and fifth and sixth diodes, which are inversely and respectively connected in parallel with the fifth and sixth switching elements.

12 Claims, 13 Drawing Sheets

(51) Int. Cl.
    *H01F 30/12*     (2006.01)
    *H02M 1/12*     (2006.01)
    *H02M 7/217*     (2006.01)
    *H02M 7/537*     (2006.01)

(52) U.S. Cl.
    CPC ............ *H02M 7/537* (2013.01); *H02M 7/487* (2013.01); *H02M 2007/4835* (2013.01)

(58) Field of Classification Search
    USPC ...................................................... 363/34–36
    See application file for complete search history.

(56) References Cited

U.S. PATENT DOCUMENTS

| | | | | |
|---|---|---|---|---|
| 9,419,541 | B2* | 8/2016 | Yoo | ........................ H02M 7/49 |
| 2002/0176261 | A1* | 11/2002 | Norrga | .................. H02M 7/758 363/17 |
| 2016/0268948 | A1* | 9/2016 | Choi | ........................ H02M 7/49 |

FOREIGN PATENT DOCUMENTS

| | | | |
|---|---|---|---|
| JP | 2009017622 | A | 1/2009 |
| JP | 2010252450 | A | 11/2010 |
| JP | 2014241660 | A | 12/2014 |
| KR | 20140122383 | A | 10/2014 |
| WO | WO 2010124634 | A1 | 11/2010 |

OTHER PUBLICATIONS

Written Opinion for related International Application No. PCT/KR2018/008109; report dated Mar. 28, 2019; (6 pages).

Extended European Search Report dated Nov. 4, 2020 for the corresponding European Application No. 18859138.2—11 Pages.

Calais M et al: "Multilevel converters for single-phase grid connected photovoltaic systems: an overview", Solar Energy, Pergamon Press. Oxford, GB, vol. 66, No. 5, Aug. 1, 1999 (Aug. 1, 1999), pp. 325-335, XP004362671, ISSN: 0038-092X, DOI: 10.1016/S0038-092X(99)00035-3—11 Pages.

Ding Kai et al: "Research on a novel three-phase hybrid asymmetric 9-level inverter", IECON 2004—30th Annual Conference of IEEE Industrial Electronics Society (IEEE Cat. No. 04CH37609) 2004IEEEPISCATAWAY, NJ, USA, Piscataway, NJ : IEEE Service Center, US, vol. 1, Nov. 2, 2004 (Nov. 2, 2004), pp. 856-861, XP010799747, DOI: 10.1109/IECON.2004.1433427 ISBN: 978-0-7803-8730-0—6 Pages.

Ding Kai et al: "Novel Hybrid Cascade Asymmetric Inverter Based on 5-level Asymmetric inverter", Power Electronics Specialists Conference, 2005. PESC '05. IEEE 36th, IEEE, Piscataway, NJ, USA, Jan. 1, 2005 (Jan. 1, 2005), pp. 2302-2306, XP031000454, DOI: 10.1109/PESC.2005.1581953 ISBN: 978-0-7803-9033-1—5 Pages.

\* cited by examiner

FIG. 1 --Prior Art--

INVERTER SYSTEM

CROSS-REFERENCE TO RELATED APPLICATIONS

The present application is a National Stage of International Application No. PCT/KR2018/008109, filed on Jul. 18, 2018, which claims the benefit of earlier filing date and right of priority to Korean Application No. 10-2017-0123403, filed on Sep. 25, 2017, and Korean Application No. 10-2017-0123402, filed on Sep. 25, 2017 the contents of which are all hereby incorporated by reference herein in their entirety.

FIELD OF THE INVENTION

The present disclosure relates to an inverter system, and more particularly, to an inverter system including an inverter having new topology.

BACKGROUND OF THE INVENTION

High voltage inverter systems use input power sources with a root-mean-square (RMS) line voltage of 600 V or more and are generally used to operate a large-capacity motor with a capacity of hundreds of kW to tens of MW. High voltage inverter systems are generally used in fields such as fans, pumps, compressors, retractors, hoists, and conveyors.

The inverter systems include a form of series-type multi-level inverter (cascade multi-level inverter) that generates three levels or more of output voltage. Magnitude and a number of output voltage levels of the inverter system are determined based on a number of unit power cells including multi-level inverter, and each of unit power cells uses an isolated input voltage.

In the inverter system, unit power cells of a plurality of unit power cells are connected electrically in series to form each of phases and a multi-phase output voltage of the inverter is determined based on a sum of output voltages of the unit power cells included in phases. In this case, the inverters included in each unit power cell may have various topologies.

FIG. 1 shows a configuration of a unit power cell including an inverter having a topology in related art.

Referring to FIG. 1, a unit power cell including an inverter having topology in related art includes a rectifier 102, a smoother 104, and an inverter 106 that synthesizes an output voltage.

The rectifier 102 receives two three-phase voltages output from an input power source. The rectifier 102 includes a plurality of diodes and a voltage magnitude of the rectified direct current (DC)-link is determined based on a difference between input power of the rectifier 102 and output power of the unit power cell.

The output of the rectifier 102 is transferred to the smoother 104 including two DC-link capacitors C1, C2 connected to each other electrically in series. The DC-link capacitors C1 and C2 function to solve instantaneous power imbalance at an input/output terminal. In FIG. 1, the capacitors C1 and C2 represent the same voltage of E.

The inverter 106 synthesizes the output voltage based on the DC voltage provided through the rectifier 102 and the DC-link capacitors C1 and C2. As shown in FIG. 1, the inverter 106 is configured based on a T-type topology in related art and includes a plurality of switching elements S1 to S8 and a plurality of diodes D1 to D12.

The switching elements S1 to S8 included in the inverter 106 are respectively connected to the corresponding diodes D1 to D8 electrically in inverse-parallel. In the present disclosure, the 'inverse parallel' between the switching element and the diode refers that a direction of current flowing through the diode and a direction of current flowing through the switching element when the switching element is turned on are opposite to each other.

The switching elements S1 and S5 and the switching elements S3 and S7 of the inverter 106 in related art shown in FIG. 1 are turned on and off in a complementary manner and the switching elements S2 and S6 and the switching element S4 and S8 are turned on and turned off in a complementary manner.

For example, in the case where the voltages of the DC-link capacitors C1 and C2 are each E, when the switching element S1 and the switching element S2 are turned on, the switching element S3 and the switching element S4 are turned off, and at this time, an output pole voltage (Vu) becomes E.

In addition, when the switching element S1 and the switching element S3 are turned on, the switching element S2 and the switching element S4 are turned off, and in this case, the output pole voltage becomes 0. Similarly, when the switching element S1 and the switching element S2 are turned off, the switching element S3 and the switching element S4 are turned on, and in this case, the output pole voltage becomes −E.

Similarly, three levels of pole voltages Vv are output based on the complementary turn-on and turn-off operation of the switching elements S5 to S8. Based on a combination of the two output pole voltages output as described above, the unit power cell in FIG. 1 may represent five voltage levels of 2E, E, 0, −E, and −2E.

However, the inverter having the topology in related art as shown in FIG. 1 includes too many switching elements and diodes. As described above, when each of unit power cells includes many elements, a possibility of failure of each of elements is increased as the number of used elements is increased. This increase in a possibility of failure results in degraded reliability of the high voltage inverter system including the inverter as shown in FIG. 1

In particular, as the number of switching elements is increased, an amount of heat generated by repeating the switching operation (turn-on/turn-off) of the switching elements is increased. The increase in the amount of heat generation causes increase in the possibility of failure of the unit power cell and the inverter system.

In addition, when the inverter including excessive elements as shown in FIG. 1 is used, there is a problem that the magnitude and the volume of the high-voltage inverter system are increased.

BRIEF SUMMARY OF THE INVENTION

The present disclosure provides an inverter and an inverter system to which new topology is applied, which may reduce a possibility of failure thereof by reducing a number of internal elements compared to an inverter having topology in related art.

The present disclosure also provides an inverter system having a reduced size and volume compared to an inverter system in the related art by reducing the number of internal elements compared to the inverter having the topology in related art.

The objects of the present disclosure are not limited to the above-mentioned objects, and the other objects and the advantages of the present disclosure which are not mentioned can be understood by the following description, and more clearly understood by the embodiments of the present disclosure. It will be also readily seen that the objects and the advantages of the present disclosure may be realized by features described in the patent claims and a combination thereof.

According to an embodiment of the present disclosure, an inverter system includes a phase shift transformer configured to convert and output a phase and magnitude of a voltage input from a power supply and a plurality of unit power cells configured to output a phase voltage based on voltage output from the phase shift transformer, and the unit power cell includes a first leg and a second leg. The first leg includes a first switching element and a fourth switching element connected to each other electrically in series, a second switching element and a third switching element connected to each other electrically in series between a connection point between the first switching element and the fourth switching element and a smoother, and a first diode, a second diode, a third diode, and a fourth diode respectively connected to the first switching element, the second switching element, the third switching element, and the fourth switching element electrically in inverse-parallel. The second leg includes a fifth switching element and a sixth switching element connected to each other electrically in series and a fifth diode and a sixth diode respectively connected to the fifth switching element and the sixth switching element electrically in inverse-parallel and is connected to the first leg electrically in parallel.

In addition, according to another embodiment of the present disclosure, the inverter system includes a phase shift transformer configured to convert and output the phase and the magnitude of the voltage input from the power supply and a plurality of unit power cells configured to output a phase voltage based on the voltage output from the phase shift transformer and the unit power cell includes a first leg and a second leg. The first leg includes a first switching element, a second switching element, a third switching element, and a fourth switching element connected to one another electrically in series, a first diode, a second diode, a third diode, and a fourth diode respectively connected to the first switching element, the second switching element, the third switching element, and the fourth switching element electrically in inverse-parallel, and a seventh diode and an eighth diode connected to each other electrically in series between a connection point between the first switching element and the second switching element and a connection point between the third switching element and the fourth switching element and the second leg includes a fifth switching element and a sixth switching element connected to each other electrically in series and a fifth diode and a sixth diode respectively connected to the fifth switching element and the sixth switching element electrically in inverse-parallel and is connected to the first leg electrically in parallel.

According to the present disclosure, inverters and inverter systems to which new topology is applied have an advantage in that a possibility of failure is reduced due to reduction in a number of internal elements compared to an inverter having topology in related art.

In addition, according to the present disclosure, the inverter system has an advantage in that a size and a volume is reduced compared to the inverter system in related art by reducing the number of internal elements compared to the inverter having the topology in related art.

DETAILED DESCRIPTION OF THE INVENTION

Figure 1:
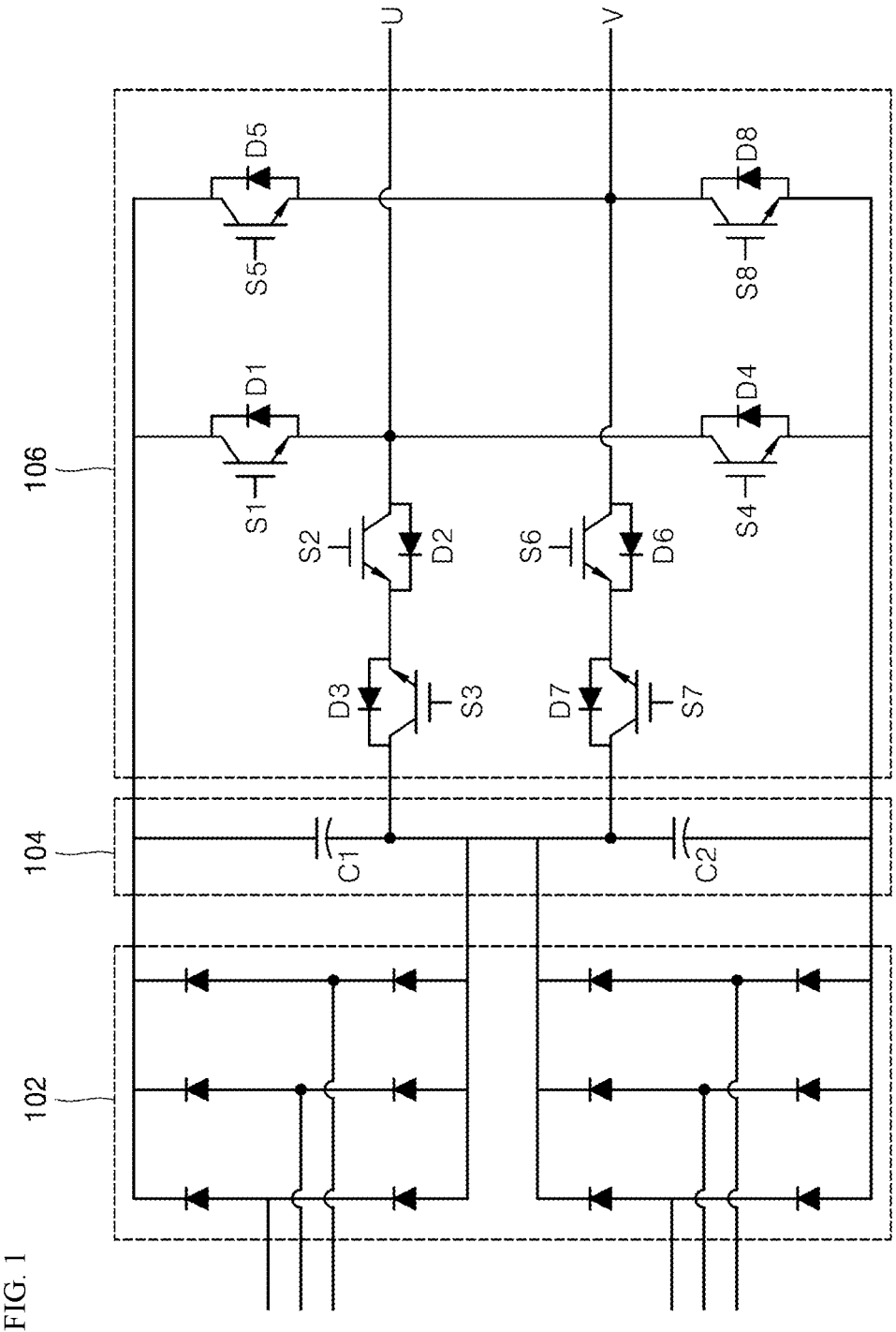
FIG. 1 shows a configuration of a unit power cell including an inverter having topology in related art.

The above objects, features, and advantages will be described in detail with reference to the accompanying drawings, whereby those skilled in the art to which the present disclosure pertains may easily implement the technical idea of the present disclosure. In describing the present disclosure, when it is determined that the detailed description of the known technology related to the present disclosure may unnecessarily obscure the gist of the present disclosure, the detailed description will be omitted. Hereinafter, exemplary embodiments of the present disclosure will be described in detail with reference to the accompanying drawings. In the drawings, the same reference numerals are used to indicate the same or similar components.

Figure 2:
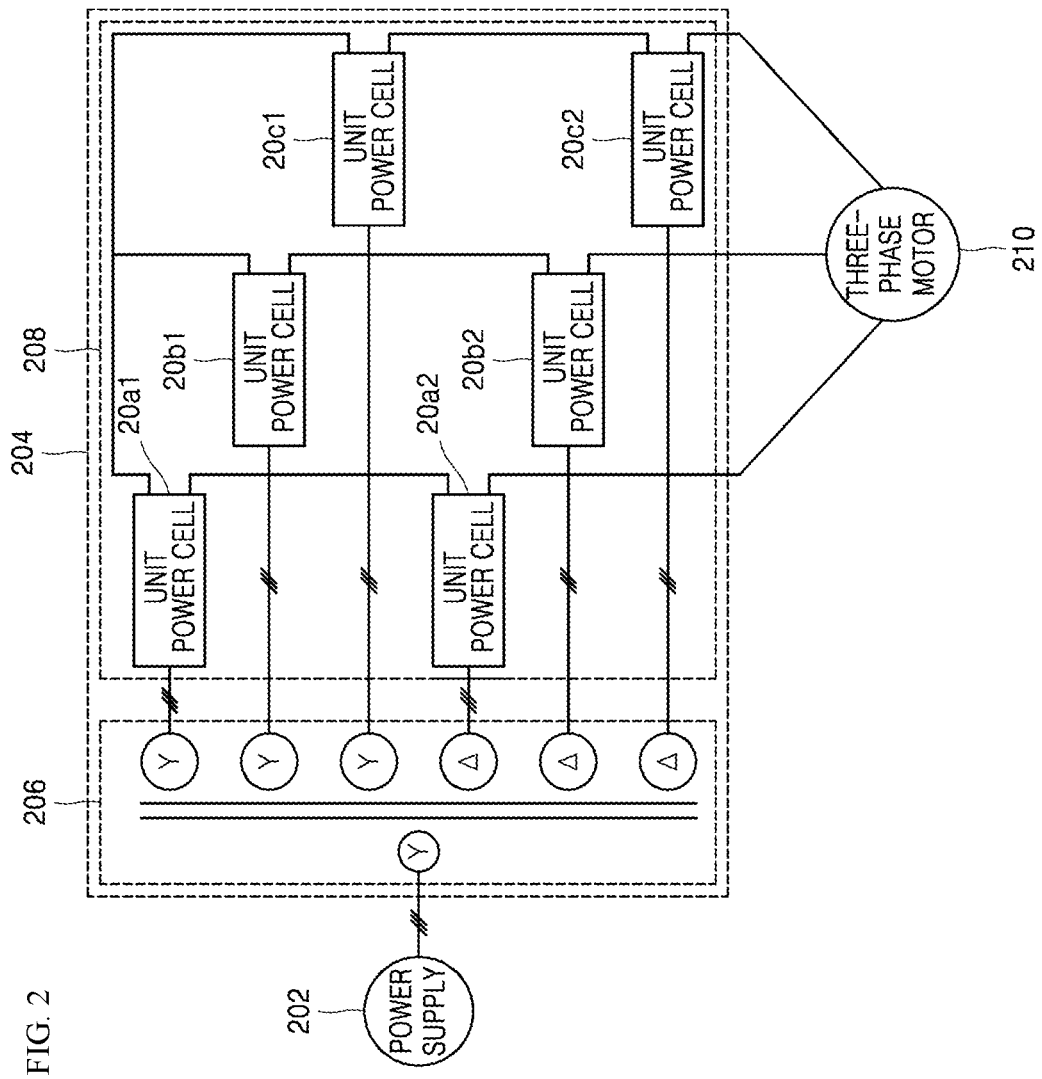
FIG. 2 shows a configuration of an inverter system according to an embodiment of the present disclosure.

FIG. 2 shows a configuration of an inverter system according to an embodiment of the present disclosure.

According to an embodiment of the present disclosure, as shown in FIG. 2, an inverter system 204 converts power input from a power supply 202 and provides the power to a three-phase motor 210. For example, the power supply 202 may supply an inverter system 204 with three-phase power having a root-mean-square (RMS) voltage of 600 V or more. In addition, the three-phase motor 210 may be an induction motor or a synchronous motor as examples of a load connected to the inverter system 204. According to embodiments, the load other than the three-phase motor 210 may be connected to the inverter system 204.

Referring back to FIG. 2, the inverter system 204 includes a phase shift transformer 206 and a plurality of unit power cells 20a1, 20a2, 20b1, 20b2, 20c1, and 20c2.

The phase shift transformer 206 may convert the phase and magnitude of the voltage input from the power supply 202 and provide the voltage to the plurality of unit power cells 20a1, 20a2, 20b1, 20b2, 20c1, and 20c2. Total harmonic distortion (THD) of the input current may be improved through the phase shift.

The unit power cells 20a1, 20a2, 20b1, 20b2, 20c1, and 20c2 receive the output voltage output from the phase shift transformer 206 and output a phase voltage suitable for a load, for example, a three-phase motor 210.

In FIG. 2, the unit power cells 20a1, 20a2, 20b1, 20b2, 20c1, and 20c2 output three-phase voltages for the three-phase motor 210. That is, two unit power cells 20a1 and 20a2 connected to each other electrically in series output a-phase voltage, and two unit power cells 20b1 and 20b2 connected to each other electrically in series output b-phase voltage, and two unit power cells 20c1 and 20c2 connected to each other electrically in series output c-phase voltage. FIG. 2 shows an example of two unit power cells being electrically connected to each other for each phase, but the number of unit power cells connected to each other for each phase may vary depending on the output voltage of the inverter system 204.

The phase voltages output by the unit power cells 20a1, 20a2, 20b1, 20b2, 20c1, 20c2 of the inverter system 204 shown in FIG. 2 have the same magnitude and the phases are different from one another by 120 degrees. In addition, the number of unit power cells of the inverter system 204 may be reduced and the THD of the output voltage and a voltage change rate (dv/dt) may be improved through various switching methods.

Configurations and operation of a unit power cell including an inverter having new topology according to the present disclosure are described below in detail with reference to FIGS. 3 to 7.

Figure 3:
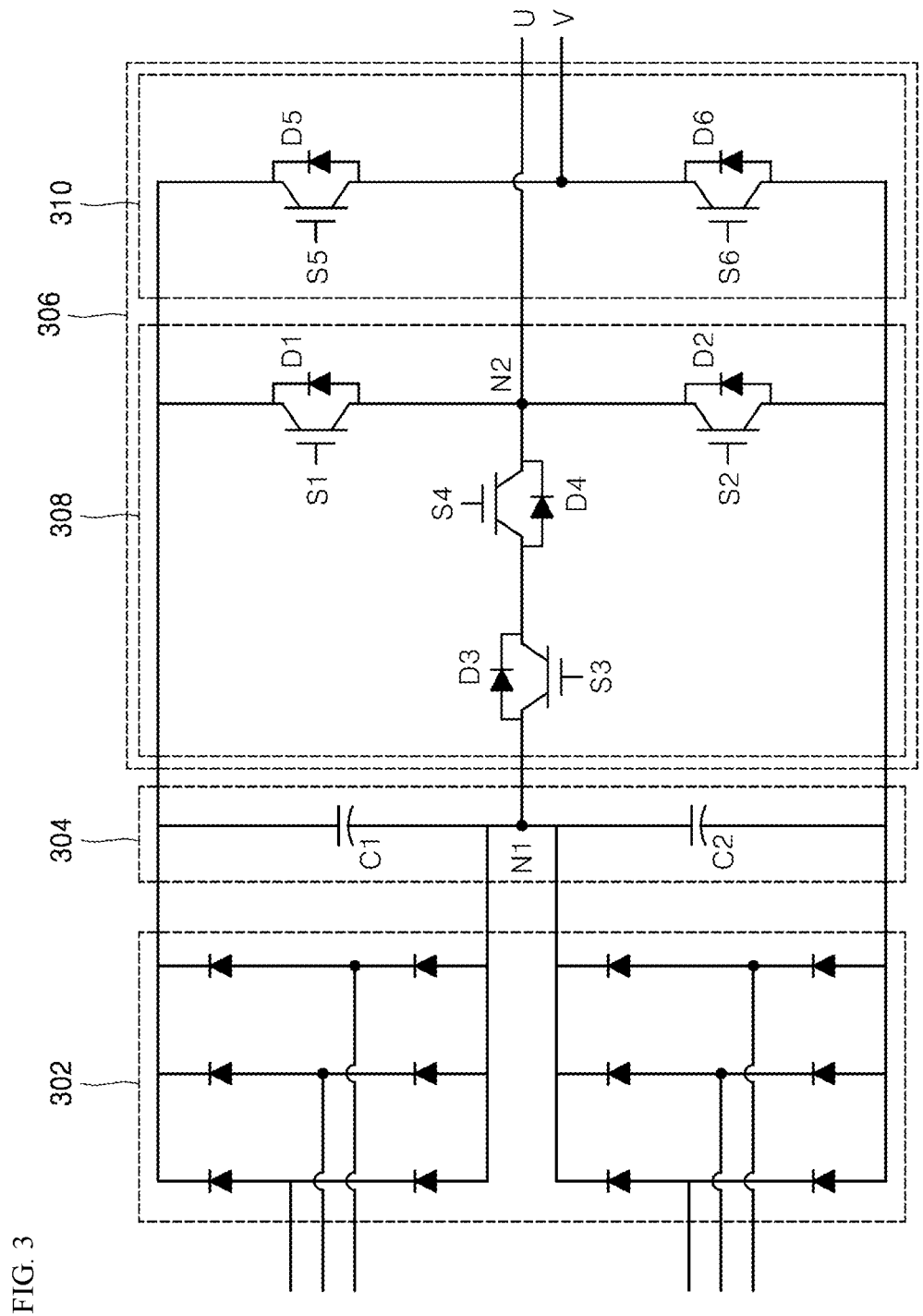
FIG. 3 is a circuit diagram showing a unit power cell included in an inverter system according to an embodiment of the present disclosure.

FIG. 3 is a circuit diagram showing a unit power cell of an inverter system according to an embodiment of the present disclosure.

According to an embodiment of the present disclosure, referring to FIG. 3, a unit power cell of an inverter system includes a rectifier 302, a smoother 304, and an inverter 306 that synthesizes an output voltage.

The rectifier 302 receives two three-phase voltages output from an input power source. The rectifier 302 includes a plurality of diodes and magnitude of the rectified DC-link voltage is determined based on a difference between input power of the rectifier 302 and output power of the unit power cell.

The output of the rectifier 302 is transmitted to the smoother 304 including two DC-link capacitors C1 and C2 connected to each other electrically in series. The DC-link capacitors C1 and C2 function to solve instantaneous power imbalance at the input/output terminal.

In the following embodiments, it is assumed that the magnitude of the voltage represented by each of the capacitors C1 and C2 is E. For reference, the magnitude of the voltage represented by each of the capacitors C1 and C2 may vary according to the embodiments.

The inverter 306 synthesizes the output voltage based on the DC voltage provided through the rectifier 302 and the DC-link capacitors C1 and C2. As shown in FIG. 3, the inverter 306 includes a first leg 308 and a second leg 310 connected to each other electrically in parallel.

The first leg 308 may include a first switching element S1 and a fourth switching element S4 connected to each other electrically in series, and a second switching element S2 and a third switching element S2 connected to each other electrically in series between a connection point N2 between the first switching element S1 and the fourth switching element S4 and a connection point N1 of the rectifier 304. Further, as shown in FIG. 3, the first leg 308 includes the first diode D1, the second diode D2, the third diode D3, and the fourth diode D4 respectively connected to the first switching element S1, the second switching element S2, the third switching element S3, and the fourth switching element S4 electrically in inverse-parallel.

The first diode D1 and the second diode D2 included in the first leg 308 are electrically connected to each other in a same direction. In addition, the third diode D3 and the fourth diode D4 are electrically connected to each other in a same direction.

Referring back to FIG. 3, the second leg 310 includes a fifth switching element S5 and a sixth switching element S6 connected to each other electrically in series, and a fifth diode D5 and a sixth diode D6 respectively connected to the fifth switching element S5 and the sixth switching element S6 electrically in inverse-parallel. The fifth diode D5 and the sixth diode D6 included in the second leg 310 are electrically connected to each other in the same direction.

The inverter 306 having the above configuration may output pole voltage having four levels, for example, a first voltage level, a second voltage level, a third voltage level, and a fourth voltage through the switching operation of the switching elements S1 to S6 described below.

The inverter 106 in related art shown in FIG. 1 includes eight switching elements and twelve diodes, whereas the inverter 306 of the unit power cell of the present disclosure shown in FIG. 3 includes six switching elements and sixth diodes. As described above, the unit power cell according to the present disclosure has less number of switching elements than that of the unit power cell in related art to relatively reduce the possibility of failure and reduce the size and the volume of the unit power cell through the arrangement of the switching elements compared to the unit power cell in related art.

Figure 4:
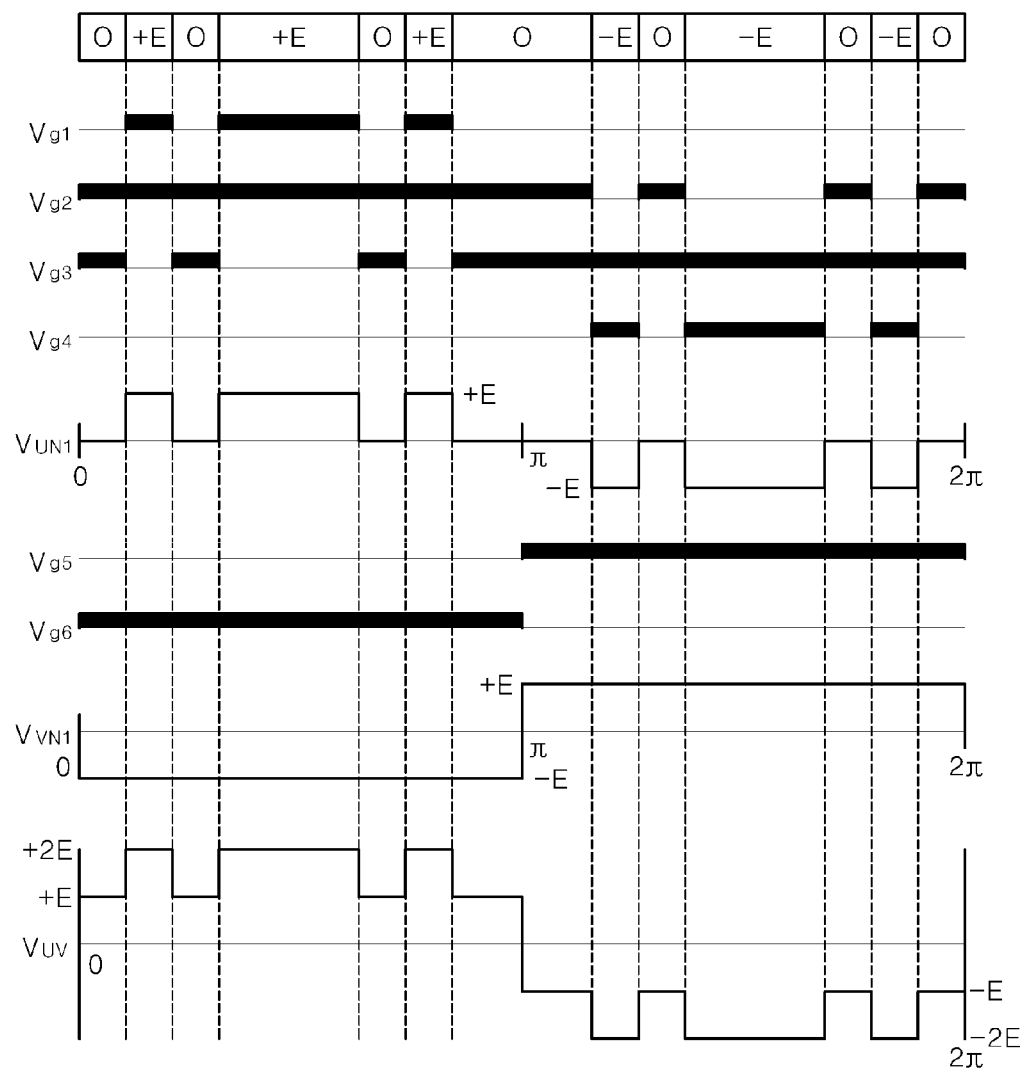
FIG. 4 shows waveforms of output pole voltages determined based on turn on/turn off states of switching elements of an inverter of the unit power cell shown in FIG. 3.

FIG. 4 shows waveforms of output pole voltages determined based on turn on/turn off states of switching elements of the inverter of the unit power cell shown in FIG. 3.

In FIG. 4, $V_{g1}$ to $V_{g6}$ refer to gate signals applied to gate terminals of the switching elements S1 to S6, respectively. That is, when gate signals $V_{g1}$ to $V_{g6}$ are displayed in black shades, the corresponding switching elements S1 to S6 are turned on. Otherwise, the switching elements S1 to S6 are turned off.

In addition, +E, 0, −E displayed at the top of FIG. 4 indicate the magnitudes of phase voltages.

According to the present disclosure, as shown in FIG. 4, each of phases (U, V) of a unit power cell may output three levels (+E, 0, −E) of phase voltages based on a turn on/off state through switching operation of each of switching elements. The unit power cell may represent the pole voltages $V_{UV}$ having four levels (+2E, +E, −E, and −2E) based on the combination of the U-phase voltage $V_{UN1}$ and V-phase voltage $V_{VN1}$.

Output of the phase voltages $V_{UN1}$ and $V_{VN1}$ determined through the switching operation of each of switching elements and the pole voltage $V_{UV}$ of the unit power cell determined based on a combination of the phase voltages $V_{UN1}$ and $V_{VN1}$ is described below in detail with reference to FIGS. 4 and 5 to 8.

FIGS. 5 to 8 respectively show a current flow determined based on a turn-on and turn-off states of switching elements of the inverter of the unit power cell shown in FIG. 3.

Figure 5:
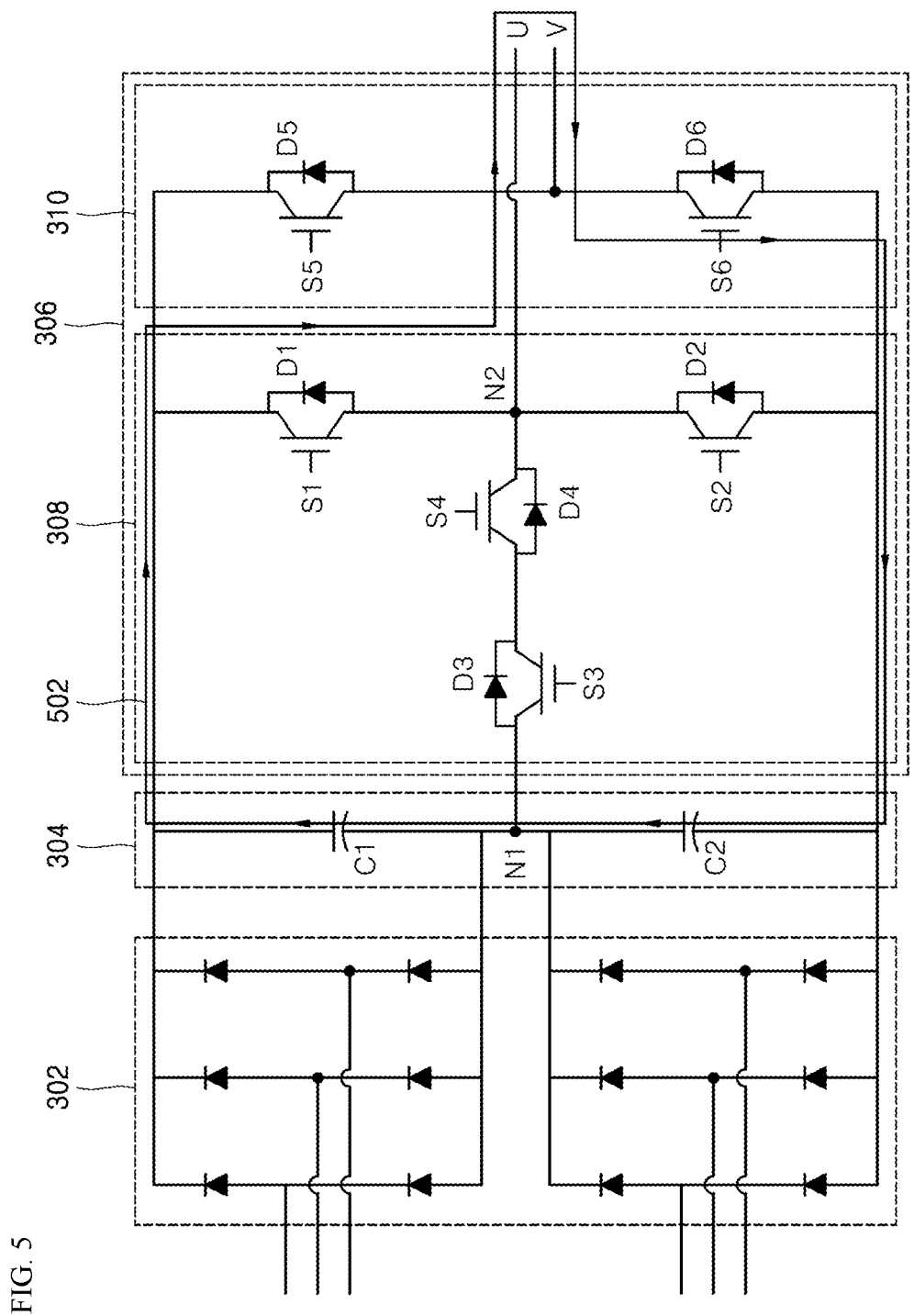
FIGS. 5 to 7 show current flow determined based on turn-on and turn-off states of switching elements of the inverter of the unit power cell shown in FIG. 3.

First, FIG. 5 shows a current flow 502 determined when a unit power cell outputs a pole voltage having a first voltage level, that is, +2E.

Referring to FIGS. 4 and 5, when the first switching element S1 and the second switching element S2 included in the inverter 306 are turned on, the U-phase voltage $V_{UN1}$ represents +E. In addition, when the sixth switching element S6 is turned on, the V-phase voltage $V_{VN1}$ represents −E. Accordingly, the pole voltage $V_{UV}$ of the unit power cell, which corresponds to a difference ($V_{UN1}-V_{VN1}$) between the U-phase voltage $V_{UN1}$ and the V-phase voltage $V_{VN1}$, satisfies equation of +E−(−E)=+2E.

As a result, when the first switching element S1, the second switching element S2, and the sixth switching element S6 included in the inverter 306 are turned on and the third switching element S3, the fourth switching element S4, and the fifth switching element S5 are turned off, the pole voltage $V_{UV}$ of the unit power cell is represented by the first voltage level, that is, +2E. In this case, as shown in FIG. 5, the current flows through the DC-link capacitors C1 and C2, the first switching element S1, and the sixth switching element S6 (see the current flow 502).

Figure 6:
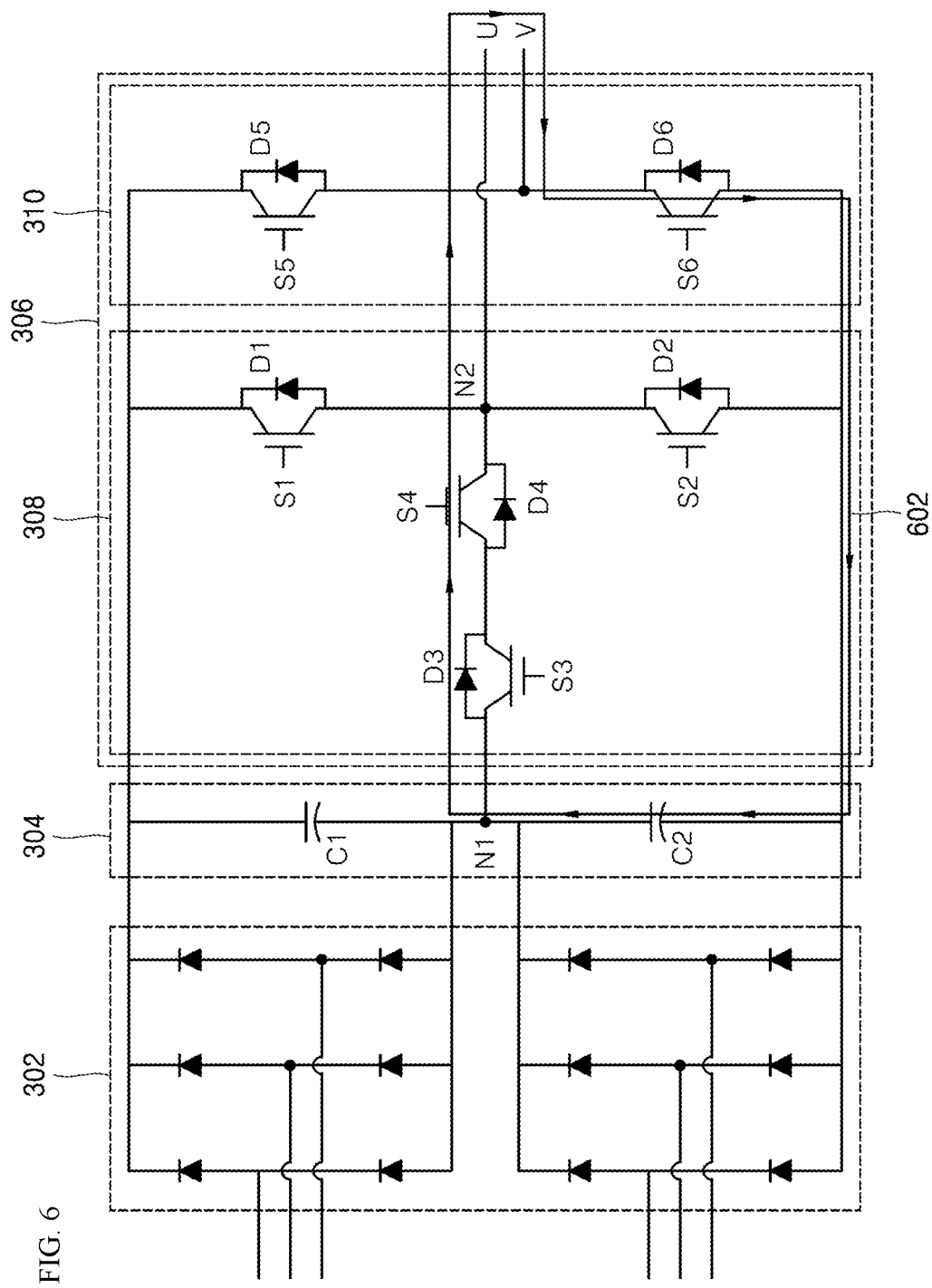

FIG. 6 shows a current flow 602 determined when a unit power cell outputs a pole voltage having a second voltage level, that is, +E.

Referring to FIGS. 4 and 6, when a second switching element S2 and a third switching element S3 included in an inverter 306 are turned on, a U-phase voltage $V_{UN1}$ represents zero. In addition, based on a six and the switching element S6 is turned on, a V-phase voltage $V_{VN1}$ represents −E. Accordingly, a pole voltage $V_{UV}$ of the unit power cell corresponding to the difference ($V_{UN1}$−$V_{VN1}$) between the U-phase voltage $V_{UN1}$ and the V-phase voltage $V_{VN1}$ satisfies equation of 0−(−E)=+E.

As a result, when the second switching element S2, the third switching element S3, and the sixth switching element S6 included in the inverter 306 are turned on and the first switching element S1, the fourth switching element S4, and the fifth switching element S5 are turned off, the pole voltage $V_{UV}$ of the unit power cell is represented by a second voltage level, that is, +E. In this case, as shown in FIG. 6, the current flows through the DC-link capacitor C2, the third switching element S3, the second diode D2, and the sixth switching element S6 (see the current flow 602).

Figure 7:
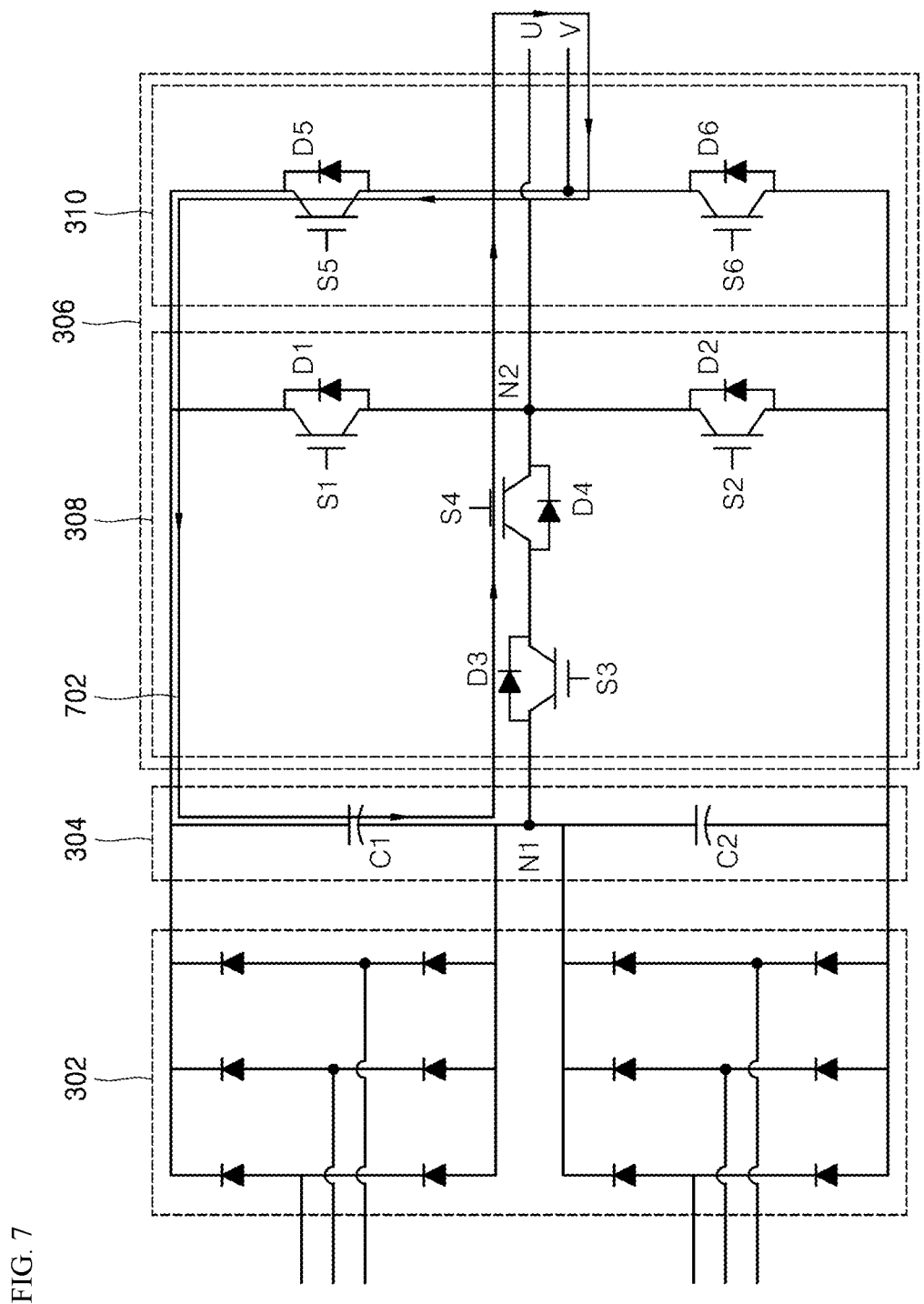

Next, FIG. 7 shows a current flow 702 determined when a unit power cell outputs a pole voltage having a third voltage level, that is, −E.

Referring to FIGS. 4 and 7, when a second switching element S2 and the third switching element S3 included in an inverter 306 are turned on, a U-phase voltage $V_{UN1}$ represents 0. In addition, when a fifth switching element S5 is turned on, a V-phase voltage $V_{VN1}$ represents +E. Accordingly, a pole voltage $V_{UV}$ of the unit power cell corresponding to a difference ($V_{UN1}$−$V_{VN1}$) between the U-phase voltage $V_{UN1}$ and the V-phase voltage $V_{VN1}$ satisfies equation of 0−(+E)=−E.

As a result, when the second switching element S2, the third switching element S3, and the fifth switching element S5 included in the inverter 306 are turned on and the first switching element S1, the fourth switching element S4, and the sixth switching element S6 are turned off, the pole voltage $V_{UV}$ of the unit power cell is represented by a third voltage level, that is, −E. In this case, as shown in FIG. 7, the current flows through the DC-link capacitor C1, the third switching element S3, the second diode D2, and the fifth switching element S5 (see the current flow 702).

Figure 8:
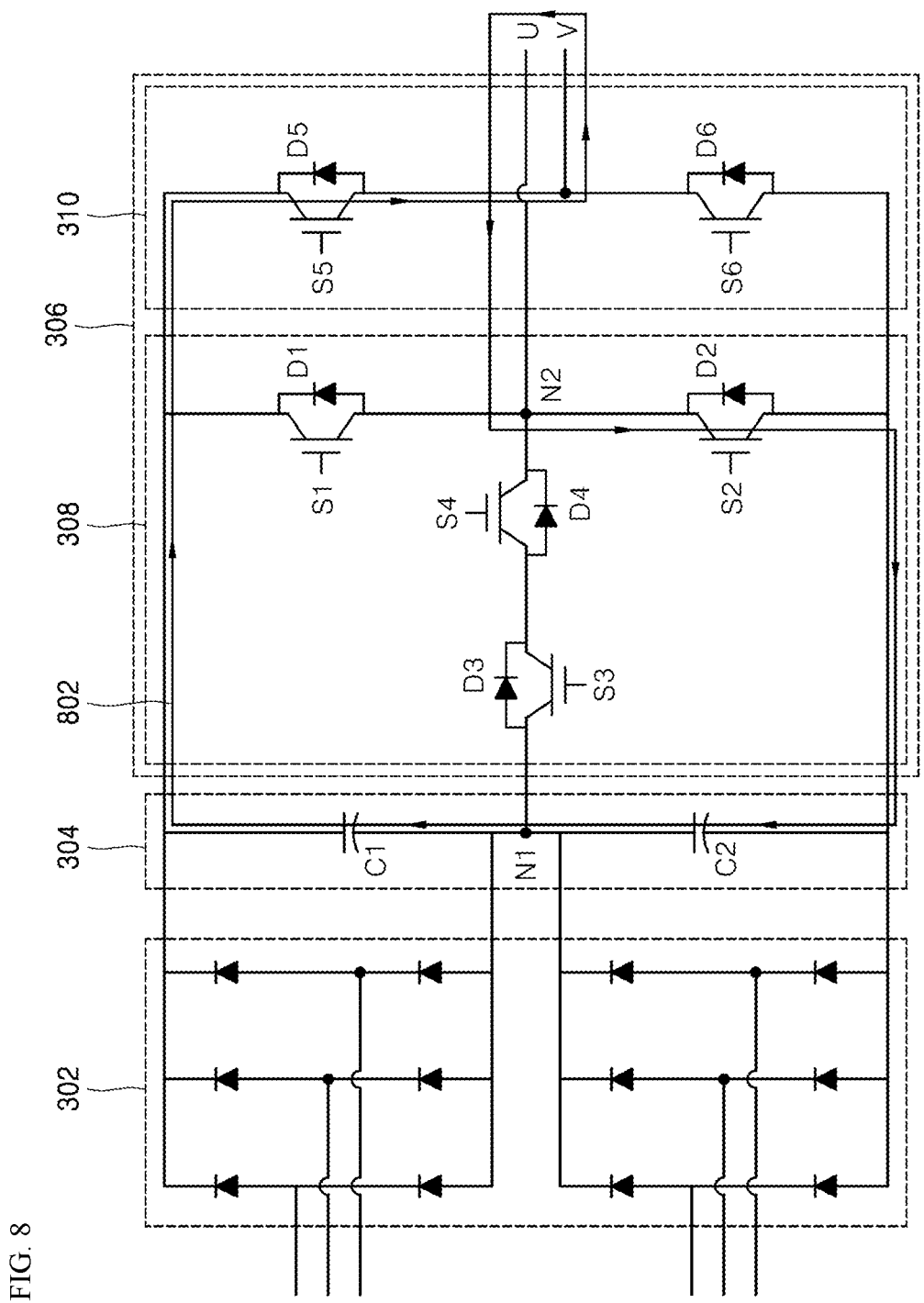
FIG. 8 shows a current flow determined when a unit power cell outputs a pole voltage according to another embodiment of the present disclosure.

Next, FIG. 8 shows a current flow 802 determined when a unit power cell outputs a pole voltage having a fourth voltage level, that is, −2E.

Referring to FIGS. 4 and 8, when a third switching element S3 and a fourth switching element S4 included in an inverter 306 are turned on, a U-phase voltage $V_{UN1}$ represents −E. In addition, when a fifth switching element S5 is turned on, a V-phase voltage $V_{VN1}$ represents +E. Accordingly, a pole voltage $V_{UV}$ of the unit power cell corresponding a difference ($V_{UN1}$−$V_{VN1}$) between the U-phase voltage $V_{UN1}$ and the V-phase voltage $V_{VN1}$ satisfies equation of −E−(+E)=−2E.

As a result, when the third switching element S3, the fourth switching element S4, and the fifth switching element S5 included in the inverter 306 are turned on and a first switching element S1, a second switching element S2, and a sixth switching element S6 are turned off, the pole voltage $V_{UV}$ of the unit power cell is represented by a fourth voltage level, that is, −2E. In this case, as shown in FIG. 8, the current flows through DC-link capacitors C1 and C2, the fifth switching element S5, and the fourth switching element S4 (see the current flow 802).

Figure 9:
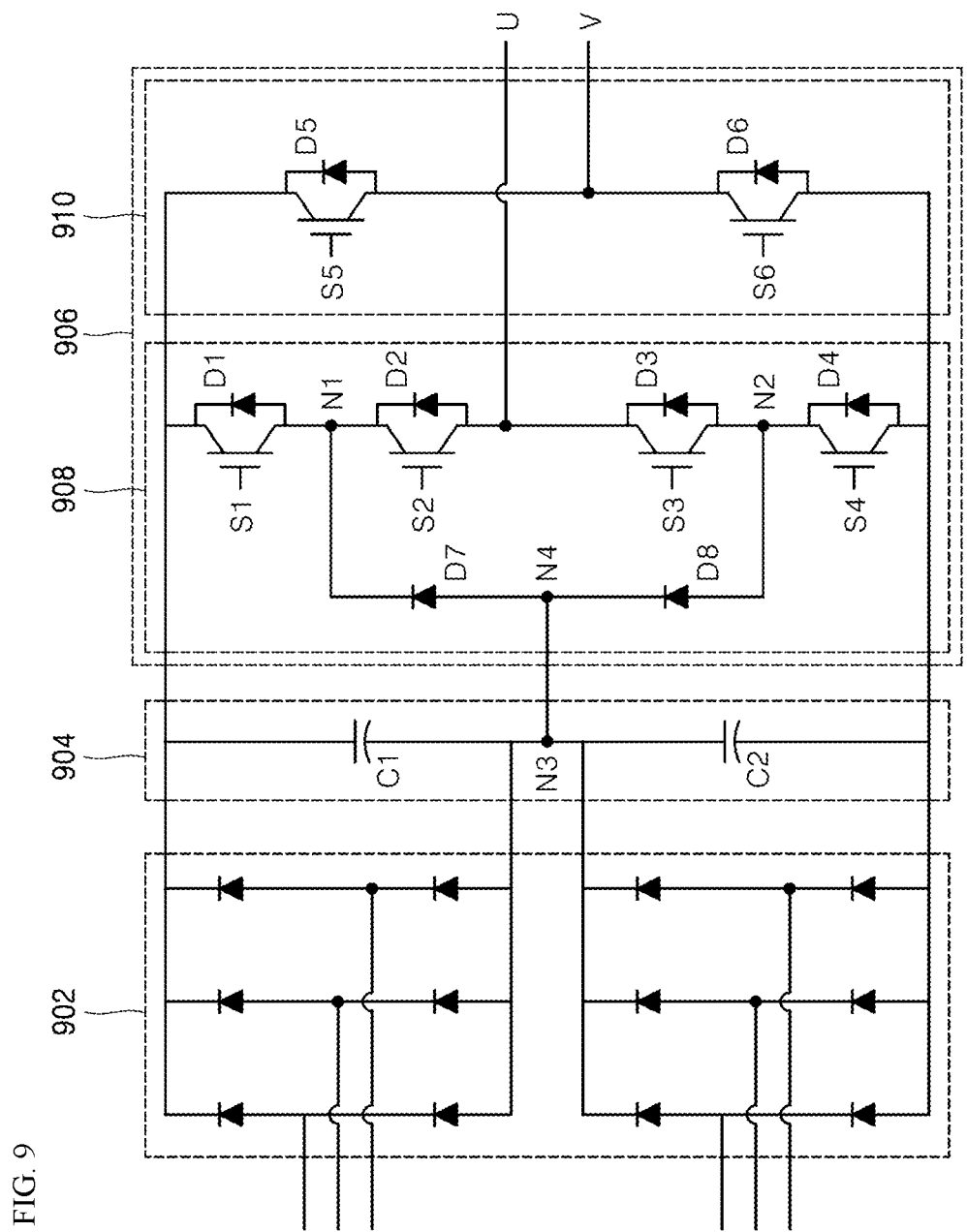
FIG. 9 is a circuit diagram showing a unit power cell included in an inverter system according to another embodiment of the present disclosure.

FIG. 9 is a circuit diagram showing a unit power cell included in inverter system according to another embodiment of the present disclosure.

According to another embodiment of the present disclosure, referring to FIG. 9, the unit power cell included in the inverter system includes a rectifier 902, a smoother 904, and an inverter 906 that synthesizes an output voltage.

The rectifier 902 receives two three-phase voltages output from an input power source. The rectifier 902 includes a plurality of diodes and magnitude of the rectified DC-link voltage is determined based on a difference between input power of the rectifier 902 and output power of the unit power cell.

The output of the rectifier 902 is transmitted to the smoother 904 including two DC-link capacitors C1 and C2 connected to each other electrically in series. The DC-link capacitors C1 and C2 function to solve instantaneous power imbalance at the input/output terminal.

In the following embodiments, it is assumed that the magnitude of the voltage represented by each of the capacitors C1 and C2 is E. For reference, the magnitude of the voltage represented by each of the capacitors C1 and C2 may vary according to the embodiment.

The inverter 906 synthesizes the output voltage based on the DC voltage provided through the rectifier 902 and the DC-link capacitors C1 and C2. As shown in FIG. 9, the inverter 906 includes a first leg 908 and a second leg 910 connected to each other electrically in parallel.

The first leg 908 includes a first switching element S1, a second switching element S2, a third switching element S3, and a fourth switching element S4 connected to one another electrically in series. In addition, as shown in FIG. 9, the first leg 908 includes the first diode D1, the second diode D2, the third diode D3, and the fourth diode D4 respectively connected to the first switching element S1, the second switching element S2, the third switching element S3, and the fourth switching element S4 electrically in inverse-parallel.

In addition, the first leg 908 includes a seventh diode D7 and an eighth diode D8 connected to each other electrically in series between a connection point N1 between the first switching element S1 and the second switching element S2 and a connection point N2 between the third switching element S3 and the fourth switching element S4. A connection point N4 between the seventh diode D7 and the eighth diode D8 is electrically connected to the connection point N3 between the DC-link capacitors C1 and C2.

The first diode D1, the second diode D2, the third diode D3, and the fourth diode D4 included in the first leg 908 are electrically connected to one another in the same direction. In addition, the seventh diode D7 and the eighth diode D8 included in the first leg 908 are electrically connected to each other in the same direction.

Referring back to FIG. 9, the second leg 910 includes a fifth switching element S5 and a sixth switching element S6 connected to each other electrically in series and a fifth diode D5 and a sixth diode D6 respectively connected to the fifth switching element S5 and the sixth switching element S6 electrically in inverse-parallel. The fifth diode D5 and the sixth diode D6 included in the second leg 910 are electrically connected to each other in the same direction.

The inverter 906 having the above configuration may output the pole voltage having four levels, for example, a first voltage level, a second voltage level, a third voltage level, and a fourth voltage through the switching operation of the switching elements S1 to S6 described below.

The inverter 106 in related art shown in FIG. 1 includes eight switching elements and twelve diodes, whereas the inverter 906 of the unit power cell of the present disclosure shown in FIG. 9 includes six switching elements and eight diodes. As described above, the unit power cell according to the present disclosure has less number of switching elements than that of the unit power cell in the related art to thereby relatively reduce the failure possibility and reduce the size and the volume of the unit power cell due to the arrangement of the switching elements compared to the unit power cell in related art. Accordingly, the possibility of failure, the size, and the volume of the inverter system 204 including the unit power cell in FIG. 9 are reduced compared to the inverter system in related art.

Output of the phase voltages $V_{UN1}$ and $V_{VN1}$ determined based on switching operation of the switching elements and pole voltage $V_{UV}$ of the unit power cell determined based on a combination of phase voltages $V_{UN1}$ and $V_{VN1}$ are described below in detail with reference to FIGS. 4 and 10 to 13.

FIGS. 10 to 13 show current flow determined based on turn-on and turn-off states of switching elements of the inverter of the unit power cell shown in FIG. 9.

Figure 10:
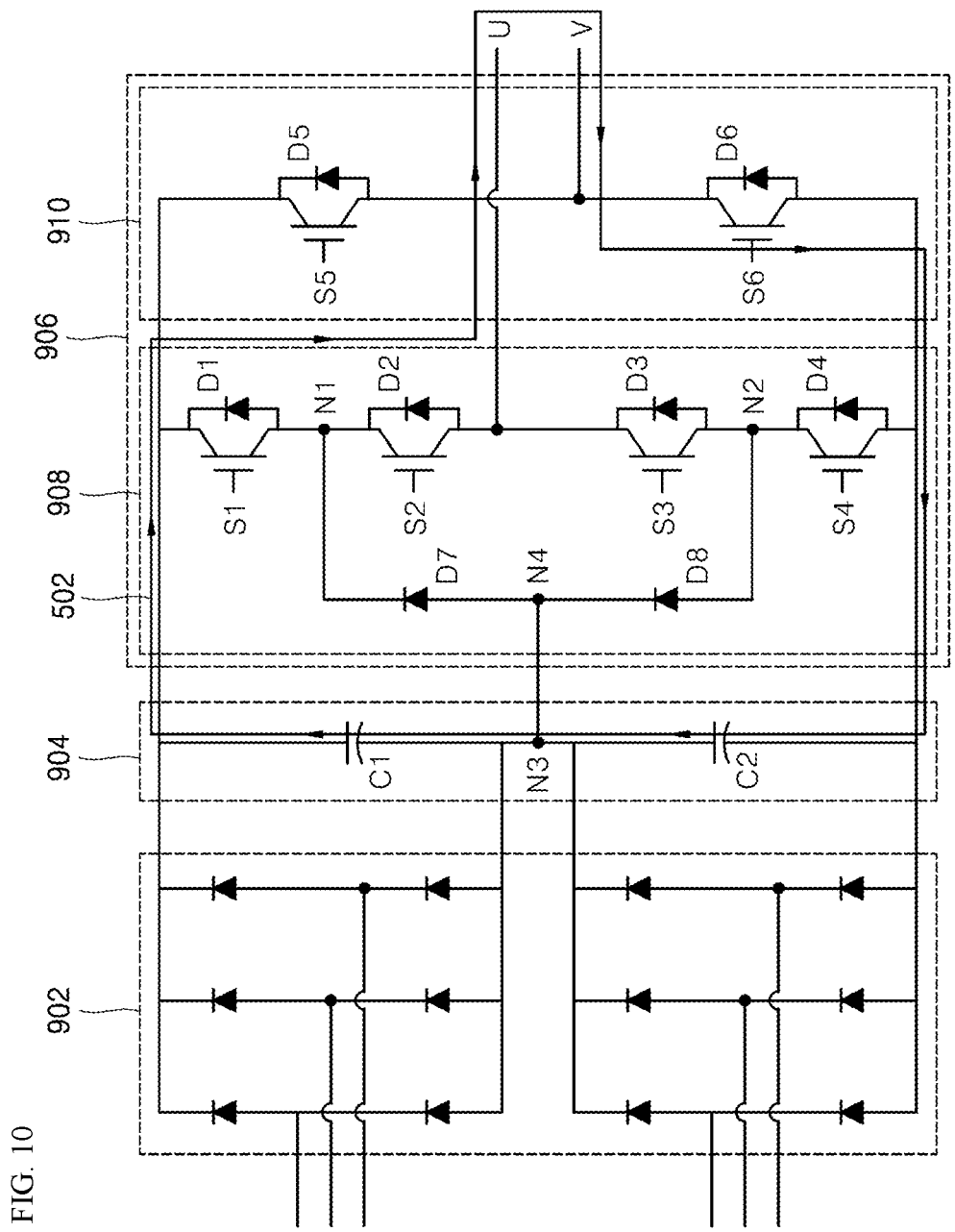
FIGS. 10 to 13 show current flow determined based on turn-on and turn-off states of switching elements of the inverter of the unit power cell shown in FIG. 9.

First, FIG. 10 shows a current flow 502 determined when a unit power cell outputs a pole voltage having a first voltage level, that is, +2E.

Referring to FIGS. 4 and 10, based on a first switching element S1 and a second switching element S2 included in an inverter 906 being turned on, a U-phase voltage $V_{UN1}$ represents +E. In addition, when a sixth switching element S6 is turned on, a V-phase voltage $V_{VN1}$ represents −E. Accordingly, a pole voltage $V_{UV}$ of the unit power cell corresponding to a difference ($V_{UN1}-V_{VN1}$) between the U-phase voltage $V_{UN1}$ and the V-phase voltage $V_{VN1}$ satisfies equation of +E−(−E)=+2E.

As a result, when the first switching element S1, the second switching element S2, and the sixth switching element S6 included in the inverter 906 are turned on and a third switching element S3, a fourth switching element S4, and a fifth switching element S5 are turned off, the pole voltage $V_{UV}$ of the unit power cell is represented by a first voltage level, that is, +2E. In this case, as shown in FIG. 10, the current flows through DC-link capacitors C1 and C2, the first switching element S1, the second switching element S2, and the sixth switching element S6 (see the current flow 502).

Figure 11:
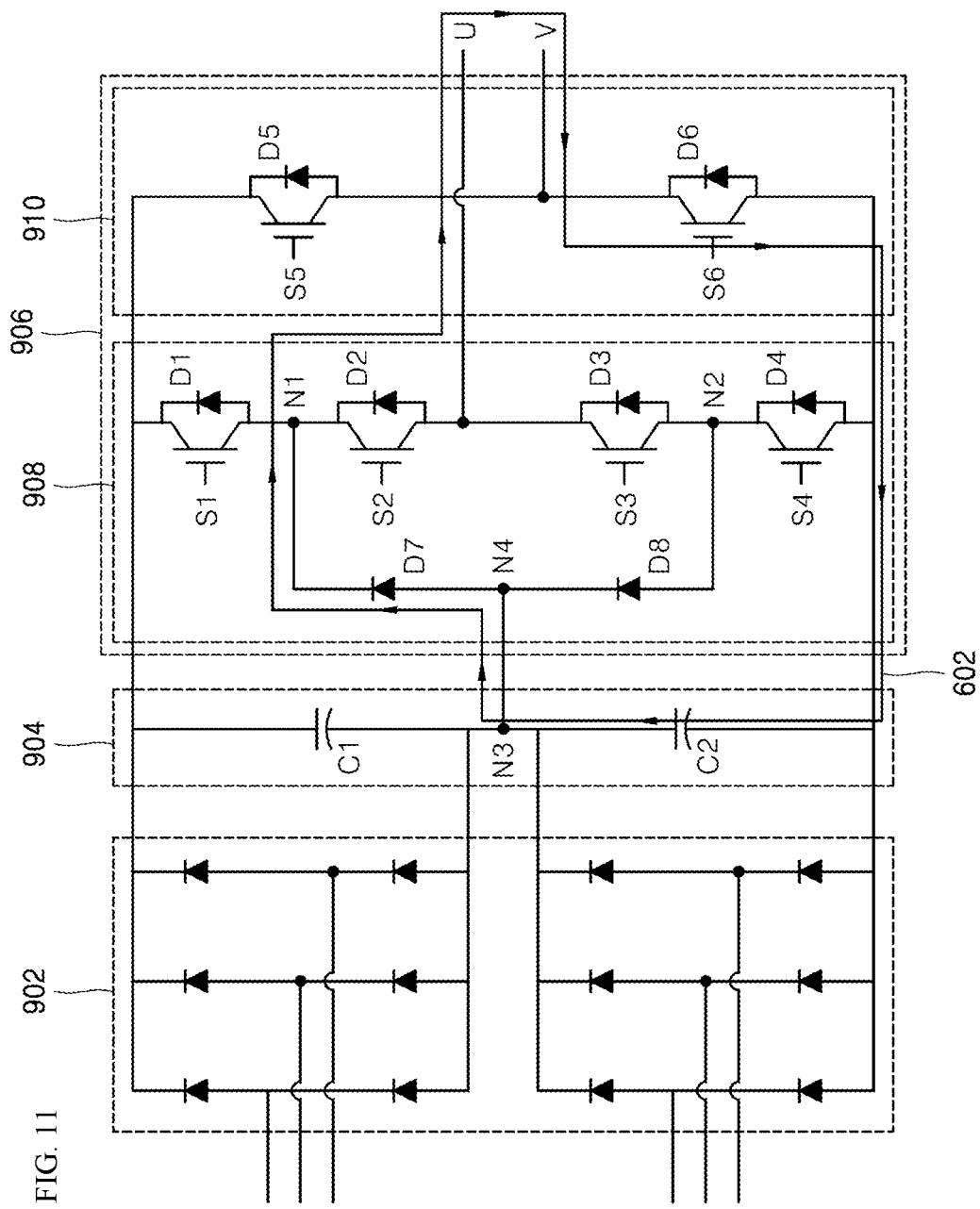

Next, FIG. 11 shows a current flow 602 determined when a unit power cell outputs a pole voltage having a second voltage level, that is, +E.

Referring to FIGS. 4 and 11, when a second switching element S2 and a third switching element S3 included in an inverter 906 are turned on, a U-phase voltage $V_{UN1}$ represents 0. In addition, when a sixth switching element S6 is turned on, a V-phase voltage $V_{VN1}$ represents −E. Accordingly, a pole voltage $V_{UV}$ of the unit power cell corresponding to a difference ($V_{UN1}-V_{VN1}$) between the U-phase voltage $V_{UN1}$ and the V-phase voltage $V_{VN1}$ satisfies equation of 0−(−E)=+E.

As a result, when the second switching element S2, the third switching element S3, and the sixth switching element S6 included in the inverter 906 are turned on and the first switching element S1 and the fourth switching element S4, and the fifth switching element S5 are turned on, the pole voltage $V_{UV}$ of the unit power cell is represented by a second voltage level, that is, +E. In this case, as shown in FIG. 11, the current flows through DC-link capacitor C2, a seventh diode D7, the second switching element S2, and the sixth switching element S6 (see the current flow 602).

Figure 12:
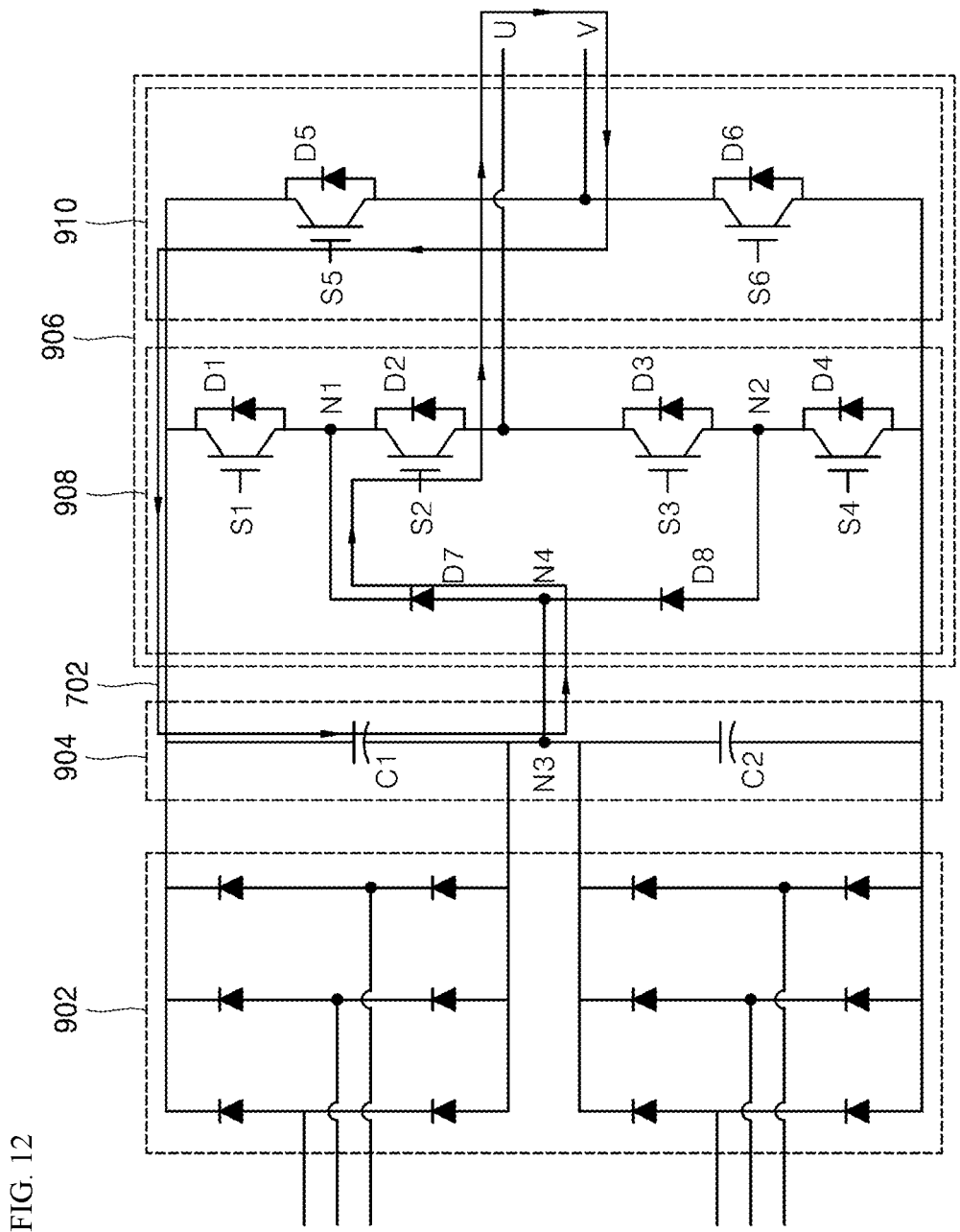

Next, FIG. 12 shows a current flow 702 determined when a unit power cell outputs a pole voltage having a third voltage level, that is, −E.

Referring to FIGS. 4 and 12, when a second switching element S2 and a third switching element S3 included in an inverter 906 are turned on, a U-phase voltage $V_{UN1}$ represents 0. In addition, when the fifth switching element S5 is turned on, a V-phase voltage $V_{VN1}$ represents +E. Accordingly, the pole voltage $V_{UV}$ of the unit power cell corresponding to a difference ($V_{UN1}-V_{VN1}$) between the U-phase voltage $V_{UN1}$ and the V-phase voltage $V_{VN1}$ satisfies equation of 0−(+E)=−E.

As a result, when the second switching element S2, the third switching element S3, and the fifth switching element S5 included in the inverter 906 are turned on and the first switching element S1 and the fourth switching element S4, and the sixth switching element S6 are turned off, the pole voltage $V_{UV}$ of the unit power cell is represented by a third voltage level, that is, −E. In this case, as shown in FIG. 12, the current flows through the DC-link capacitor C1, the seventh diode D7, the second switching element S2, and fifth switching element S5 (see the current flow 702).

Figure 13:
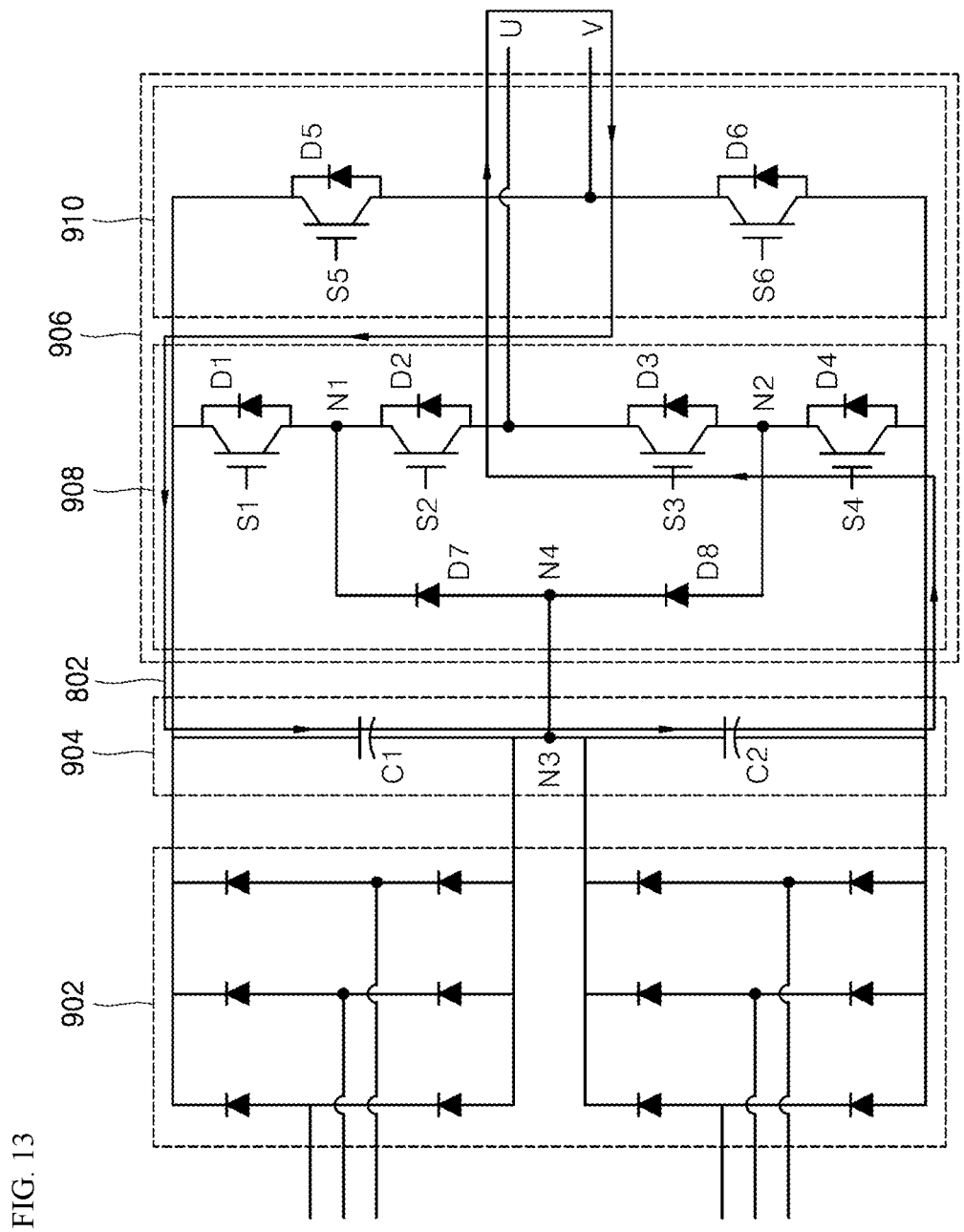

Next, FIG. 13 shows a current flow 802 determined when a unit power cell outputs a pole voltage having a fourth voltage level, that is, −2E.

Referring to FIGS. 4 and 13, when a third switching element S3 and a fourth switching element S4 included in an inverter 906 are turned on, a U-phase voltage $V_{UN1}$ represents −E. In addition, when a fifth switching element S5 is turned on, a V-phase voltage $V_{VN1}$ represents +E. Accordingly, a pole voltage $V_{UV}$ of the unit power cell corresponding to a difference ($V_{UN1}-V_{VN1}$) between the U-phase voltage $V_{UN1}$ and the V-phase voltage $V_{VN1}$ satisfies equation of −E−(+E)=−2E.

As a result, when the third switching element S3, the fourth switching element S4, and the fifth switching element S5 included in the inverter 906 are turned on and a first switching element S1, a second switching element S2, and a sixth switching element S6 are turned off, the pole voltage $V_{UV}$ of the unit power cell is represented by a fourth voltage level, that is, −2E. In this case, as shown in FIG. 13, the current flows through DC-link capacitors C1 and C2, the third switching element S3, the fourth switching element S4, and the fifth switching element S5 (see the current flow 802).

As described above, the unit power cell including the inverter having the new topology of the present disclosure may include less number of elements than that of the power unit cell in related art to output the pole voltages having four levels. As described above, the number of elements may be reduced to reduce the failure possibility of the unit power cell and the inverter system to thereby improve reliability and reduce the size, the volume, and production costs of the unit power cell and the inverter system.

In particular, as the number of switching elements used for the inverter is reduced, the amount of heat generated by the switching elements is also reduced compared inverter systems in related art. The possibility of failure of the entire inverter system is reduced due to the reduction in the amount of generated heat. In addition, the size of additional components, for example, heat sinks, to solve heat generation of the inverter system may be reduced, which helps to reduce the size and volume of the inverter system.

Various substitutions, modifications, and changes can be made within a range that does not deviate from the technical idea of the present disclosure for a person having ordinary skill in the art to which the present disclosure pertains, and thus, the above-mentioned present disclosure is not limited to the above-mentioned embodiments and accompanying drawings.

The invention claimed is:

1. An inverter system, comprising:
a phase shift transformer configured to convert and output a phase and magnitude of a voltage input from a power supply;
a plurality of unit power cells configured to output a phase voltage based on a voltage output from the phase shift transformer,
wherein each unit power cell comprises:
a first leg comprising a first switching element and a fourth switching element connected to each other electrically in series, a second switching element and a third switching element connected to each other electrically in series between a connection point between the first switching element and the fourth switching element and a smoother, and a first diode, a second diode, a third diode, and a fourth diode respectively connected to the first switching element, the second switching element, the third switching element, and the fourth switching element electrically in inverse-parallel; and
a second leg comprising a fifth switching element and a sixth switching element connected to each other electrically in series and a fifth diode and a sixth diode respectively connected to the fifth switching element and the sixth switching element electrically in inverse-parallel and is connected to the first leg electrically in parallel,
wherein a pole voltage of the unit power cell represents a first voltage level when the first switching element, the second switching element, and the sixth switching element are turned on and the third switching element, the fourth switching element, and the fifth switching element are turned off.

2. The inverter system of claim 1, wherein a pole voltage of the unit power cell represents a second voltage level when the second switching element, the third switching element, and the sixth switching element are turned on and the first switching element, the fourth switching element, and the fifth switching element are turned off.

3. The inverter system of claim 1, wherein a pole voltage of the unit power cell represents a third voltage level when the second switching element, the third switching element, and the fifth switching element are turned on and the first switching element, the fourth switching element, and the sixth switching element are turned off.

4. The inverter system of claim 1, wherein a pole voltage of the unit power cell represents a fourth voltage level when the third switching element, the fourth switching element, and the fifth switching element are turned on and the first switching element, the second switching element, and the sixth switching element are turned off.

5. The inverter system of claim 1, wherein the second diode and the third diode are electrically connected to each other in different directions from each other.

6. The inverter system of claim 1, wherein the first diode, the fourth diode, the fifth diode, and the sixth diode are electrically connected to one another in a same direction.

7. An inverter system, comprising:
a phase shift transformer configured to convert and output a phase and magnitude of a voltage input from a power supply; and
a plurality of unit power cells configured to output a phase voltage based on a voltage output from the phase shift transformer;
wherein each unit power cell comprises a first leg and a second leg and the first leg comprises a first switching element, a second switching element, a third switching element, and a fourth switching element, a first diode, a second diode, a third diode, and a fourth diode respectively connected to the first switching element, the second switching element, the third switching element, and the fourth switching element electrically in inverse-parallel, a seventh diode and an eighth diode connected to each other electrically in series between a connection point between the first switching element and the second switching element and a connection point between the third switching element and the fourth switching element and the second leg comprises a fifth switching element and a sixth switching element connected to each other electrically in series and a fifth diode and a sixth diode respectively connected to the fifth switching element and the sixth switching element electrically in inverse-parallel and is connected to the first leg electrically in parallel, and
wherein a pole voltage of the unit power cell represents a first voltage level when the first switching element, the second switching element, and the sixth switching element are turned on and the third switching element, the fourth switching element, and the fifth switching element are turned off.

8. The inverter system of claim 7, wherein a pole voltage of the unit power cell represents a second voltage level when the second switching element, the third switching element, and the sixth switching element are turned on and the first switching element, the fourth switching element, and the fifth switching element are turned off.

9. The inverter system of claim 7, wherein a pole voltage of the unit power cell represents a third voltage level when the second switching element, the third switching element, and the fifth switching element are turned on and the first switching element, the fourth switching element, and the sixth switching element are turned off.

10. The inverter system of claim 7, wherein a pole voltage of the unit power cell represents a fourth voltage level when the third switching element, the fourth switching element, and the fifth switching element are turned on and the first switching element, the second switching element, and the sixth switching element are turned off.

11. The inverter system of claim 7, wherein the first diode, the second diode, the third diode, the fourth diode, the fifth diode, and the sixth diode are connected to one another in a same direction.

12. The inverter system of claim 7, wherein the seventh diode and the eighth diode are electrically connected to each other in a same direction.

* * * * *

UNITED STATES PATENT AND TRADEMARK OFFICE
CERTIFICATE OF CORRECTION

| | | |
|---|---|---|
| PATENT NO. | : 11,038,436 B2 | |
| APPLICATION NO. | : 16/637433 | |
| DATED | : June 15, 2021 | |
| INVENTOR(S) | : Sung-Guk Ahn et al. | |

It is certified that error appears in the above-identified patent and that said Letters Patent is hereby corrected as shown below:

On the Title Page

Please add "SEOUL NATIONAL UNIVERSITY R&DB FOUNDATION, Seoul (KR)" to item (73) Assignee.

Signed and Sealed this
Third Day of January, 2023

Katherine Kelly Vidal
*Director of the United States Patent and Trademark Office*